United States Patent Office 2,963,513
Patented Dec. 6, 1960

2,963,513

POLYGLYCOL ETHER DERIVATIVES

Otto Albrecht, Neuewelt, near Basel, Switzerland, assignor to Ciba Limited, Basel, Switzerland, a Swiss firm No Drawing. Filed Sept. 21, 1956, Ser. No. 611,357

Claims priority, application Switzerland Nov. 28, 1955

5 Claims. (Cl. 260—584)

This invention provides new derivatives of polyglycol ethers containing an average of at least 10

—CH₂—CH₂—O— groups with primary monamines which contain an aliphatic hydrocarbon radical having at least 20 carbon atoms.

The invention also provides a process for the manufacture of the aforesaid derivatives, wherein a polyglycol ether chain is introduced, advantageously by means of ethylene oxide, into a primary monamine, which contains an aliphatic hydrocarbon radical having at least 20 carbon atoms, so as to yield a reaction product containing an average of at least 10 —CH₂—CH₂—O— groups.

As starting materials there are used, for example, aliphatic primary monamines containing an unsaturated or saturated, branched or more especially unbranched hydrocarbon radical. Good results are obtained, for example, by using amines of the formula $$H_3C—(CH_2)_n—NH_2$$

in which n represents a whole number of at least 19, and which may be, for example, 19 or 21.

It is generally of advantage to use alkylamines containing an unbranched carbon chain having an even number of carbon atoms, as such amines are easily obtainable.

There may also be used as starting materials mixtures of amines, which contain at least 10 percent and advantageously at least 20 percent of amines containing at least 20 carbon atoms and up to 90 percent of primary aliphatic amines containing less than 20 carbon atoms. Thus, there may be used, for example, mixtures which consist substantially of amines of the formula $$H_3C—(CH_2)_n—NH_2$$

in which n represents an odd number of at least 15 and at most 21, and of which at least 10 percent, and advantageously at least 20 percent, of the amines in the mixture contain at least 20 carbon atoms.

As examples of amines suitable as starting materials in the present process there may be mentioned arachidylamine, behenylamine, lignocerylamine and montanylamine, and also erucylamine and brassidylamine.

There are also suitable mixtures of fatty amines of high molecular weight having a content of at least 10 percent of fatty amines having a carbon chain of at least 20 carbon atoms. Such mixtures of fatty amines are obtainable, for example, from suitable natural fats or oils, which contain a proportion such as is indicated above of fatty acids containing at least 20 carbon atoms, by converting the fatty acids, obtained by hydrolysis of such a fat or oil, by means of ammonia into fatty acid amides or fatty acid nitriles, and finally subjecting the latter to catalytic hydrogenation. Natural fats or oils suitable for this purpose are for example, rape seed oil, and if desired, hydrogenated marine animal oils or fish oils such, for example, as whale oil, cod-liver oil, menhaden oil and sardine oil.

The reaction of these nitrogenous compounds with ethylene oxide is carried out in the usual manner, advantageously at a raised temperature and with the exclusion of atmospheric oxygen, advantageously in the presence of a suitable catalyst, for example, a small amount of an alkali metal or an alkali metal hydroxide, carbonate or acetate.

Especially suitable polyglycol ether derivatives for the process hereinbefore referred to are obtained by reacting a quantity of ethylene oxide such that the reaction product contains an average of at least 20, but preferably 50-100 —CH₂—CH₂—O-groups The new polyglycol ether derivatives can also be made by introducing a polyglycol ether chain into an amine of the kind defined above with the aid of a compound already containing such chain. As compounds of this kind there are especially suitable polyglycol ether halides.

As is apparent from the foregoing remarks the polyglycol ether derivatives of the formula

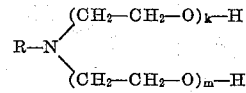

are especially valuable, in which R represents an aliphatic hydrocarbon radical containing at least 20 carbon atoms, and k and m are whole numbers and the sum k+m is at least 10 and advantageously 50-100.

The new polyglycol ether derivatives, which contain at least one basic, for example, a tertiary, nitrogen atom, can be converted in known manner into salts, for example, acetates, or if desired into quaternary ammonium salts, and used in this form.

The new polyglycol ether derivatives of the invention are very suitable as agents for shifting the equilibrium of the distribution of dyestuff between an aqueous liquor and basic nitrogenous fibers, especially wool. As is known, there exists in a system consisting of an aqueous liquor, nitrogenous fibers and a dyestuff having an affinity for the fibers, an equilibrium depending on time between the quantity by weight of dyestuff dissolved in the liquor and the quantity thereof fixed on the fiber. Under the usual dyeing conditions this equilibrium, in the case of most wool dyestuffs, is such that by far the greater proportion of the dyestuff is fixed on the fiber and only a small residual amount remains dissolved in the dyebath. Agents are known which are capable of shifting the equilibrium in favour of the liquor. In suitable, preferably small, quantities such agents have the effect, especially in the case of dyestuffs that are rapidly and almost completely absorbed by the fiber, only of retarding the dyeing process so that the dyeing obtained is hardly weakened at all, but is decidedly more level, and this is known as a levelling action. However, the aforesaid agents, especially when added in larger quantities, are capable of reversing the dyeing process so that dyestuff is removed from the dyed fibers up to a point very far removed from the original equilibrium.

It has been found that the polyglycol ether derivatives of this invention are especially suitable for shifting the equilibrium, that is to say, they are suitable as additions in dyeing or lightening or stripping dyeings. The conditions used for this purpose are those customarily used.

As dyestuffs there may be used for dyeing the known dyestuffs, for example, non-metallizable wool dyestuffs, chrome dyestuffs or dyestuffs containing metal in complex union, which are applied to nitrogenous fibers from acid or neutral baths, for example, to wool. Especially valuable results are produced with complex metal compounds, advantageously complex chromium or cobalt compounds of monoazo-dyestuffs, in which one atom of metal is bound in complex union with two molecules of azo-dyestuffs, and which metal compounds are free from carboxylic acid and sulfonic acid groups or contain not more than one such group. With these dyestuffs wool or other nitrogenous fibers can be dyed in known manner usually from weakly acid, for example, acetic acid, to neutral baths. In order to produce a levelling effect, or in order to avoid the tippy dyeing of wool, the polyglycol ether derivative may be added to the dyebath at the same time as the dyestuff. However, it is especially advantageous first to treat the fibrous material, for example, wool, advantageously at a raised temperature, in a bath containing the polyglycol ether derivative, and to add the dyestuff later. The quantity of the polyglycol ether derivative to be added to the dyebath may vary within wide limits. Usually, for example, a quantity within the range of 0.1 to 2 percent calculated on the weight of the fibrous material, may be added. It is especially advantageous to add to the dyebath a quantity of the polyglycol ether derivative within the range of 0.5 to 1.5 percent calculated on the weight of the fibrous material, the quantity of the polyglycol ether derivative being, for example, about 50 percent calculated on the weight of the dyestuff added.

In dyeing by the process of this invention not only can the aforesaid levelling effect be produced, which, inter alia, can be utilized for the level dyeing of wools having different properties, for example, chlorinated and unchlorinated wool, but further advantageous effects can be observed, for example, that the fastness to rubbing of the dyeings is not impaired thereby, whereas it is considerably reduced when other levelling agents previously proposed are used.

The polyglycol ether derivatives of the invention can be used as stripping agents or lightening agents for treating dyeings produced on the aforesaid fibers with any desired dyestuffs, for example, those which are suitable for dyeing from strongly acid (sulfuric acid) or weakly acid (acetic acid) baths, and contain metal bound in complex union, or advantageously dyestuffs free from metal bound in complex union. Depending on the effect desired there may be added to the dyebath for example, 1-10 percent of the polyglycol ether derivative calculated on the weight of the wool. There may, of course, be used for striping dyeings other stripping agents, for example, reducing agents suitable for this purpose, such as sodium hydrosulfite, in addition to the polyglycol ether derivatives.

The following examples illustrate the invention, the parts and percentages being by weight:

*Example 1*

13.7 parts of an ordinary commercial mixture of primary alkylamines containing about 30 percent of palmitylamine, 40 percent of stearylamine, 20 percent of arachidylamine and 10 percent of behenylamine are heated to fusion in a current of nitrogen, then 0.14 part of sodium is added and the whole is heated to 160° C. Ethylene oxide is then introduced in a finely distributed gas stream at 160–170° C. until 154 parts thereof have been absorbed. At a reaction temperature of 160–170° C. it takes about 3 hours before the reaction sets in. The total reaction period is about 12 hours. It is of advantage in the above reaction to produce the fine distribution of ethylene oxide with the aid of a glass frit. The product so obtained is a wax-like mass which is easily soluble in water. It can be used, for example, as a levelling agent for wool dyestuffs in dyeing from acid liquors.

A product having similar properties is obtained, by using, instead of 13.7 parts of the said ordinary commercial mixture of primary alkylamines, 14 parts of the mixture of fatty amines such as is obtained by converting the fatty acids of hydrogenated sardine oil by means of ammonia into the corresponding fatty acid nitriles, and catalytically hydrogenating the nitriles with the aid of a cobalt catalyst.

A product having similar properties is also obtained by using, instead of the aforesaid ordinary commercial mixture of alkylamines, 14 parts of a mixture of fatty amines having a content of about 95 percent of erucylamine (remainder consisting of higher saturated fatty amines). The latter mixture can be obtained in known manner by reesterifying rape seed oil with a methanolic solution of hydrochloric acid of 1.5 percent strength, separating a main fraction consisting principally of erucic acid methyl ester by vacuum distillation, converting this fraction into a product consisting preponderantly of erucic acid nitrile by catalytic reaction with ammonia at about 500° C. over aluminium oxide, and then reducing the nitrile mixture to the corresponding amine mixture by means of sodium and butanol.

*Example 2*

The procedure is the same as described in Example 1, except that 220 parts of ethylene oxide are caused to react, instead of 154 parts thereof. The reaction product is also a wax-like mass. It can be used as a levelling or stripping agent for acid wool dyestuffs.

*Example 3*

12 parts of an ordinary commercial mixture of primary alkylamines, containing about 10 percent of stearylamine, 55 percent of arachidylamine and 35 percent of behenylamine, are heated in a current of nitrogen at 170° C., then 0.12 part of metallic sodium is added, and ethylene oxide is introduced at 160–170° C. in the form of a finely distributed gas stream until 121 parts thereof have been absorbed. The absorption of ethylene oxide is very slow at first and becomes brisker only after a reaction priod of about 5 hours. When obtained in this manner, the reaction product is a wax-like mass which is easily soluble in water. It can be used as a levelling agent for acid wool dyestuffs.

*Example 4*

15 parts of the mixture of primary alkylamines used in Example 3 are heated to 170° C. in a current of nitrogen, 0.15 part of metallic sodium is added, and ethylene oxide is introduced at 160–170° C. in the form of a finely distributed gas stream until 108.5 parts thereof have been absorbed. The reaction product is a wax-like mass which is easily soluble in water. It can be used as a levelling agent for acid wool dyestuffs.

*Example 5*

40 parts of the mixture of primary alkylamines used in Example 3 are heated to 140° C., 0.4 part of metallic sodium is added, and ethylene oxide is introduced at 135–140° C. in the form of a finely distributed gas stream until 175 parts thereof have been absorbed. The new ethoxylation product, which is a wax-like mass easily soluble in water, can be used, for example, for stripping wool dyeings.

*Example 6*

15 parts of arachidylamine or 16 parts of behenylamine are reacted with 150 parts of ethylene oxide in the manner described in the first paragraph of Example 1. There is obtained a water-soluble product which can be used as a levelling agent for wool dyestuffs.

*Example 7*

100 parts of wool piece goods are entered at 50° C. into a bath which contains in 4000 parts of water 4 parts of acetic acid of 40 percent strength, 20 parts of sodium sulfate containing water of crystallisation and 0.5 part of the polyglycol ethylene derivative obtainable as described in the first paragraph of Example 1. 1 part of the complex chromium compound of the dyestuff of the formula

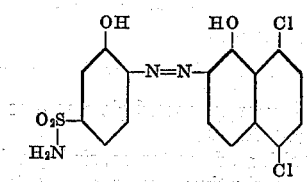

which compound contains 2 molecules of monoazo-dyestuff bound in complex union with one atom of chromium, is dissolved in a small amount of water, and the solution is added to the dyebath. The temperature is raised in the course of 30–45 minutes to the boil and dyeing is carried on for ½ hour at the boil. The wool piece goods are then rinsed in the cold and dried. There is obtained a level blue dyeing of good fastness to rubbing.

By dyeing unchlorinated and chlorinated wool in the same manner in one bath, each of these two kinds of wool is dyed practically the same tint, whereas without the addition of the polyglycol ether derivative the chlorinated wool is much more strongly dyed.

Instead of the aforesaid dyestuff there may be used for dyeing in the above manner the metal compounds of the dyestuffs of the formulae

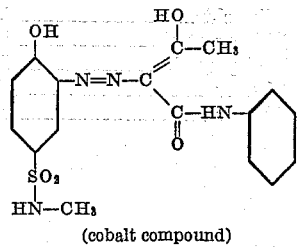

(cobalt compound)

or

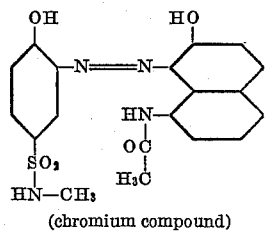

(chromium compound)

which also contain two molecules of monoazo-dyestuff bound in complex union to one atom of metal, or a mixture of these dyestuffs may be used.

Example 8

100 parts of wool piece goods are entered at 50° C. into a bath which contains 4 parts of ammonium sulfate in 4000 parts of water, 1 part of the bordeaux-dyeing cobalt complex of the dyestuff of the formula

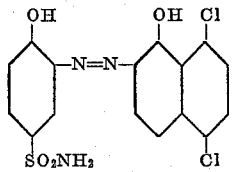

which contains two molecules of monoazo-dyestuff bound in complex union to one atom of cobalt, is added dissolved in a small amount of water, and the whole is gradually heated to the boil in the course of 45 minutes and then boiled for a further ½ hour.

The steam is turned off, and then 4 parts of acetic acid of 40 percent strength and 0.5 part of the polyglycol ether derivative obtained as described in the first paragraph of Example 1 are added to the liquor. Boiling is then continued for a further 30–60 minutes until the full shade has been developed. The dyeing is then finished in the usual manner. There is obtained a substantially more level dyeing than is obtained without the addition of the levelling agent.

In the same manner more level dyeings can be produced with the yellowish red-dyeing chromium complex of the dyestuff of the formula

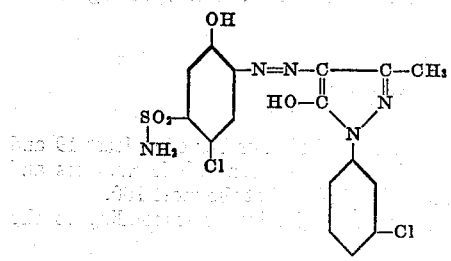

Example 9

0.2 part of the dyestuff of the formula

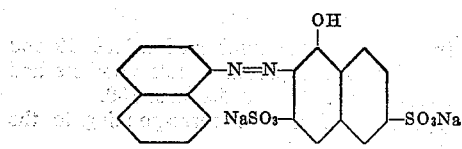

0.1 part of the dyestuff of the formula

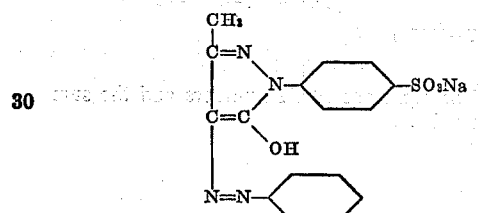

and 0.1 part of a mixture of methyl violet and the dyestuff of the formula

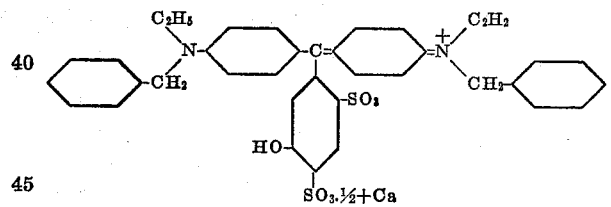

are dissolved in hot water, then diluted to 4000 parts with water, and 4 parts of sulfuric acid, 20 parts of sodium sulfate containing water of crystallization and 2 parts of the polyglycol ether derivative obtained as described in Example 3 are added.

The whole is heated to 60° C. and 100 parts of wetted wool cheviot are entered into the dyebath. The bath is then heated in the course of ¼ hour to 95° C., and maintained at that temperature for about ½ hour. The wool piece goods are then rinsed and dried. There is obtained a considerably more level combination dyeing than is obtained without the addition of the levelling agent.

Example 10

In order to strip a dyeing the procedure may be as follows: Wool, which has been dyed with 1 percent of the reddish blue-dyeing chromium complex of the dyestuff of the formula

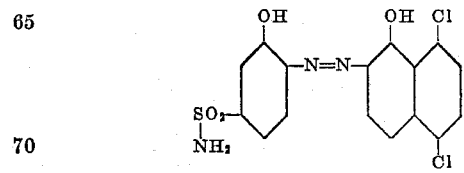

which contains 2 molecules of monoazo-dyestuff bound in complex union to one atom of chromium, is treated for one hour at the boil and at a liquor ratio of 1:40 in a bath which contains 3 percent of the polyglycol ether derivative obtained as described in the first paragraph of Example 1, calculated on the weight of the fiber. The material is then rinsed and dried. In this manner the dyestuff is removed to a very great extent.

What is claimed is:

1. A polyglycolether derivative corresponding to the formula

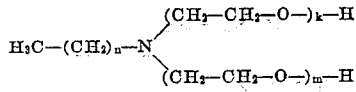

in which $n$ represents a whole number of at least 19 and at most 21, and $k$ and $m$ represent whole numbers and the sum $k+m$ is at least 30 and at the most 100.

2. A polyglycolether derivative corresponding to the formula

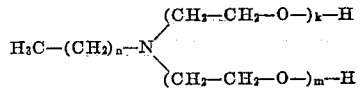

in which $n$ represents a whole number of at least 19 and at most 21, and $k$ and $m$ represent whole numbers and the sum $k+m$ is at least 50 and at the most 100.

3. A polyglycolether derivative corresponding to the formula

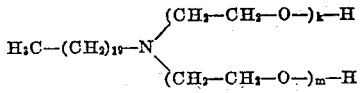

in which $k$ and $m$ represent whole numbers and the sum of $k+m$ is about 70.

4. A polyglycolether derivative corresponding to the formula

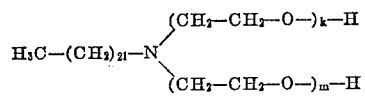

in which $k$ and $m$ represent whole numbers and the sum of $k+m$ is about 70.

5. A composition of matter consisting substantially of polyglycolether derivatives corresponding to the formula

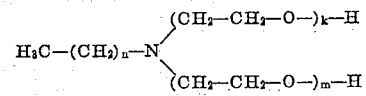

in which $n$ represents an odd number of at least 17 and at the most 21, $k$ and $m$ represent whole numbers and the sum $k+m$ is about 30, which polyglycolether derivatives are obtained by reacting about 30 mols of ethylene oxide with 1 mol of a mixture of amines consisting substantially of 10 percent of stearylamine, 55 percent of arachidylamine and 35 percent of behenylamine.

References Cited in the file of this patent

UNITED STATES PATENTS

| | | |
|---|---|---|
| 2,470,080 | Millson et al. | May 10, 1949 |
| 2,590,073 | Albrecht | Mar. 25, 1952 |
| 2,638,404 | Millson et al. | May 12, 1953 |
| 2,681,354 | Kelley et al. | June 15, 1954 |
| 2,739,980 | Chester | Mar. 27, 1956 |
| 2,813,044 | Chester | Nov. 12, 1957 |